United States Patent [19]

Nishikawa et al.

[11] Patent Number: 5,091,249
[45] Date of Patent: Feb. 25, 1992

[54] MAGNETIC RECORDING MEDIUM LUBRICANT COMPRISING TWO DIFFERENT FLUORINATED POLYETHERS EACH HAVING SPECIFIED TERMINAL GROUPS

[75] Inventors: Yasuo Nishikawa; Kunihiko Sano, both of Kanagawa, Japan

[73] Assignee: Fuji Photo Film Co., Ltd., Kanagawa, Japan

[21] Appl. No.: 551,114

[22] Filed: Jul. 11, 1990

[30] Foreign Application Priority Data

Jul. 11, 1989 [JP] Japan .................................. 1-178546

[51] Int. Cl.⁵ .............................................. G11B 05/00
[52] U.S. Cl. .................................... 428/336; 428/421; 428/694; 428/695; 428/900
[58] Field of Search ............... 428/694, 698, 900, 336, 428/421; 252/52 A, 54

[56] References Cited

U.S. PATENT DOCUMENTS

| | | | |
|---|---|---|---|
| 4,267,238 | 5/1981 | Chernega | 428/422 |
| 4,268,556 | 5/1981 | Pedrotty | 428/695 |
| 4,692,378 | 9/1987 | Ishihara et al. | 428/340 |
| 4,696,845 | 9/1987 | Yanagisawa | 428/64 |
| 4,786,544 | 11/1988 | Saito | 428/143 |
| 4,816,334 | 3/1989 | Yokoyama et al. | 428/336 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium comprising a non-magnetic support having a magnetic layer thereon, wherein the surface of the magnetic layer contains (a) a first fluorinated polyether having an oxo acid group or an oxo acid salt group at one or both terminals thereof, and (b) a second fluorinated polyether having a group selected from a alkoxycarbonyl group, an acyloxy group and a hydroxyl group at one or both terminals thereof, or the polyether (a) and polyether (b) are incorporated into the magnetic layer.

9 Claims, No Drawings

MAGNETIC RECORDING MEDIUM LUBRICANT COMPRISING TWO DIFFERENT FLUORINATED POLYETHERS EACH HAVING SPECIFIED TERMINAL GROUPS

FIELD OF THE INVENTION

This invention relates to a magnetic recording medium comprising a non-magnetic support having thereon a coating type magnetic layer composed of ferromagnetic powder dispersed in a binder resin or a metal thin film magnetic layer composed of a ferromagnetic metallic thin film. More particularly, it relates to a magnetic recording medium which is excellent in running properties and durability over a wide temperature and humidity range.

BACKGROUND OF THE INVENTION

Significantly higher-density recording has been demanded in connection with the development of magnetic recording mediums in recent years. Attempts to smooth the surface of the magnetic layer have been made as a possible means for attaining enhanced high-density recording.

For example, the surface of the magnetic layer is smoothed by incorporation of finely comminuted ferromagnetic powder or by pressing the surface thereof when the magnetic layer is a coating type magnetic layer composed of ferromagnetic powder dispersed in a binder resin. Additionally, in magnetic recording mediums having a magnetic layer composed of a ferromagnetic metallic thin film and designed for use as a high-density recording layer, the surface of the magnetic layer has a surface even smoother than that of said coating type magnetic layer.

When the surface of the magnetic layer is smoothed, a coefficient of friction of the magnetic layer with each part in a recording and reproducing apparatus is increased during the running of magnetic recording mediums. As a result, there is a greater risk that the surface of the magnetic layer will be damaged, or that the magnetic layer may be peeled off from the non-magnetic support.

Furthermore, given the popularity of floppy disk driving type devices, VTR, personal computers and word processors, magnetic recording mediums in recent years have been used over a wide range of conditions of from low temperature such as −10° C. to high temperature such as 40° C. under high-humidity such as 80% RH environmental conditions.

Accordingly, magnetic recording mediums are demanded which have good running durability under wide variety of environmental conditions and which possess stable characteristics which do not undergo significant change in response to environmental conditions.

To solve the above described problems, prior attempts have been made to contain lubricants such as fatty acids, fatty acid esters, hydrocarbons and silicone compounds in the magnetic layer or the surface thereof.

However, sufficient durability cannot be imparted to magnetic recording mediums capable of coping with recent high-density recording by these conventional lubricants.

The application of fluorinated oils such as perfluoropolyethers to ferromagnetic metallic thin film type magnetic recording mediums such as typically high-density recording video tapes has been examined. For example, perfluoropolyethers have been used which have terminals modified by addition of polar groups as described in U.S. Pat. Nos. 4,267,238 and 4,268,556, West German Patent 3,000,583 and JP-B-60-10368 (the term "JP-B" as used herein means an "examined Japanese patent publication"). The perfluoropolyethers having terminal polar groups are excellent in fixation to the surfaces of the magnetic layers of the magnetic recording mediums.

Further, attempts have been made to provide good lubricity as well as good fixation to the surface of lower magnetic layer by using a combination of a perfluoropolyether having a polar group with a perfluoropolyether having no polar group [see, JP-A-61-113126 (the term "JP-A" as used herein means an "unexamined published Japanese patent application") and U.S. Pat. No. 4,267,238]. The application of these perfluoropolyethers has an effect of enhancing durability over a wide range of from low temperature to high temperature conditions in comparison with conventional hydrocarbon lubricants. However, a problem is encountered in that a coefficient of friction is increased when the recording medium repeatedly run under low humidity (i.e., 10% RH) conditions.

The present invention is intended to solve such problems associated with the prior art as mentioned above.

SUMMARY OF THE INVENTION

An object of the present invention is to provide a magnetic recording medium which is excellent in running durability under a wide range of environmental conditions, allows high-density recording to be made and can be a magnetic recording medium comprised of a coating type magnetic layer or a metallic thin film magnetic layer.

The above-described object of the present invention has been achieved by providing a magnetic recording medium comprising a non-magnetic support having thereon a magnetic layer, wherein the surface of said magnetic layer contains (a) a first fluorinated polyether having an oxo acid group or an oxo acid salt group at one or both terminals thereof, and (b) a second fluorinated polyether having a group selected from an alkoxycarbonyl group, an acyloxy group and a hydroxyl group at one or both terminals thereof.

DETAILED DESCRIPTION OF THE INVENTION

The present invention will be explained in greater detail below.

The first fluorinated polyether having an oxo acid group or an oxo acid salt group has high fixation property to the surface of the magnetic layer and therefore has an effect of reducing the coefficient of friction of the magnetic layer. The second fluorinated polyether having a terminal group selected from an alkoxycarbonyl group, an acyloxy group and a hydroxy group does not possess as high a fixation property to the surface of the magnetic layer as compared to the first fluorinated polyether, but exhibits a good lubricating action.

Accordingly, when the first fluorinated polyether and the second fluorinated polyether are used in combination in the magnetic recording medium of the present invention, the magnetic recording mediums exhibit all the above-described advantages. Accordingly, the magnetic recording mediums can be provided possessing good running durability under wide environmental conditions ranging from low temperature to high temperature and from low humidity to high humidity.

Specifically, the first fluorinated polyether having a relatively strong polar group has high fixation to the surface of the magnetic layer, but has poor fluid lubricity and does not provide sufficient running durability when used alone. The second fluorinated polyether has substantial affinity with the surface of the magnetic layer in comparison with non-polar group containing fluorinated polyethers, however, it doesn't have the capability to exist in a stable condition on the surface of the magnetic layer over a prolonged period of time in comparison with the first fluorinated polyether. Hence, when the second fluorinated polyether alone is used, extended running durability is difficult to achieve. When both the first and second fluorinated polyether compounds are used in combination in the magnetic recording medium of the present invention, the disadvantages of each compound are compensated for by the other compound while the advantages of each compound can be exploited so that good running durability under wide environmental conditions can be attained.

When each of the fluorinated polyethers are used alone, it cannot be expected that the magnetic recording medium exhibits excellent running durability under wide environmental conditions. The unexpected effect obtained only by using both compounds in combination is thought to be due to the fact that the perfluoropolyether having an oxo acid (or salt) group has adsorptivity to substrate metal and the second fluorinated polyether having a group selected from an alkoxycarbonyl group, an acyloxy group and a hydroxyl group is properly affinitive with the substrate (metal and/or the surface of the magnetic layer on which an oxo acid (or salt) group is adsorbed) and has excellent fluidity.

The magnetic recording medium of the present invention is excellent in running property under low humidity conditions as compared to the conventionally known magnetic recording mediums using conventional lubricants.

Since the first fluorinated polyether used for the magnetic layer of the present invention has an oxo acid group or an oxo acid salt group, it has large hydrophilic nature and is liable to bond the surface of the ferromagnetic powder particles or the surface of the ferromagnetic metal thin film, but it has poor fluidity. On the other hand, the second fluorinated polyether having a terminal group selected from an alkoxycarbonyl group, an acyloxy group and a hydroxyl group has excellent fluidity. Therefore, the recording medium of the present invention using the first fluorinated polyether and the second fluorinated polyether in combination has excellent lubricity, and further has excellent running durability under low humidity conditions due to the large hydrophilic nature.

The first fluorinated polyether used for the magnetic layer of the present invention has an oxo acid group or an oxo acid salt group at one or both terminals thereof. The number-average molecular weight of the first fluorinated polyether is preferably 1,800 to 10,000.

Examples of the oxo acid group or the oxo acid salt group include, —COOH, —COOM, —OCOOH, —OCOOM, —SO$_3$H, —SO$_3$M, —OSO$_3$H, —OSO$_3$M, —PO$_3$H$_2$, —PO$_3$M$_2$, —PO$_3$HM, —OPO$_3$H$_2$, —OPO$_3$M$_2$, —OPO$_3$HM, —SO$_2$H, —SO$_2$M, —OSO$_2$H, —OSO$_2$M, —SO$_3$M, —PO$_2$H$_2$, —PO$_2$M$_2$, —PO$_2$HM, —OPO$_2$H$_2$, —OPO$_2$M$_2$, —OPO$_2$HM, —BO$_2$H$_2$, —BO$_2$M$_2$, —BO$_2$HM, —OBO$_2$H$_2$, —OBO$_2$M$_2$, —OBO$_2$HM, for example, wherein M is a cation other than hydrogen. Examples of M include Na, K, Li, NH$_4$, Zn$_{(\frac{1}{2})}$, Be$_{(\frac{1}{2})}$, Mg$_{(\frac{1}{2})}$, Ca$_{(\frac{1}{2})}$, Sr$_{(\frac{1}{2})}$, Co$_{(\frac{1}{2})}$, Ni$_{(\frac{1}{2})}$, Cu$_{(\frac{1}{2})}$, ammonium such as primary ammonium, secondary ammonium, tertiary ammonium and quaternary ammonium. Among them, there are particularly preferred —SO$_3$Na, —SO$_3$H, —PO$_3$H$_2$, —PO$_3$K$_2$, —COOH, —PO$_3$Na$_2$, —SO$_3$K, —COONa and —COOK.

Examples of the first fluorinated polyether include

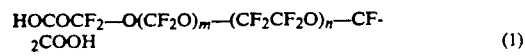  (1)

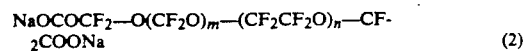  (2)

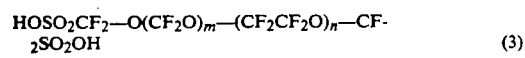  (3)

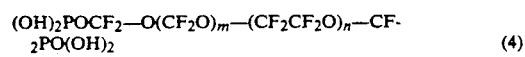  (4)

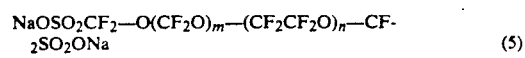  (5)

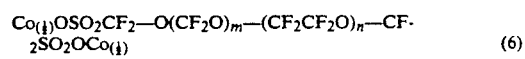  (6)

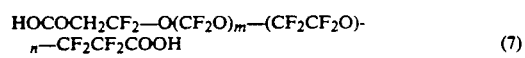  (7)

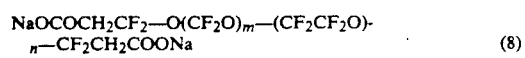  (8)

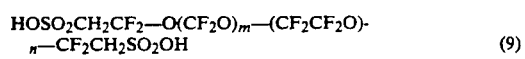  (9)

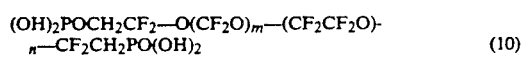  (10)

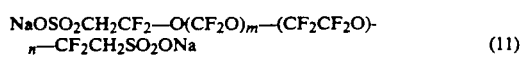  (11)

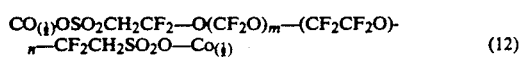  (12)

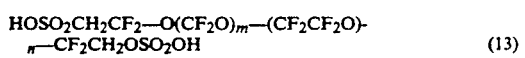  (13)

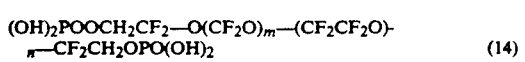  (14)

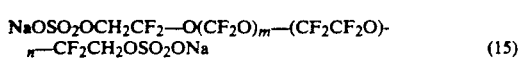  (15)

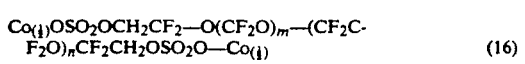  (16)

$$CF_3-O(CF_2O)_m-(CF_2CF_2O)_n-CF_2COOH \quad (17)$$

$$CF_3-O(CF_2O)_m-(CF_2CF_2O)_n-CF_2COONa \quad (18)$$

$$CF_3-O(CF_2O)_m-(CF_2CF_2O)_n-CF_2SO_2OH \quad (19)$$

$$CF_3-O(CF_2O)_m-(CF_2CF_2O)_n-CF_2PO(OH)_2 \quad (20)$$

$$CF_3-O(CF_2O)_m-(CF_2CF_2O)_n-CF_2SO_2ONa \quad (21)$$

$$CF_3-O(CF_2O)_m-(CF_2CF_2O)_n-CF_2SO_2OCo_{(\frac{1}{2})} \quad (22)$$

$$CF_3-O(CF_2O)_m-(CF_2CF_2O)_n-CF_2CH_2OSO_2OH \quad (23)$$

$$CF_3-O(CF_2O)_m-(CF_2CF_2O)_n-CF_2CH_2OPO(OH)_2 \quad (24)$$

$$CF_3-O(CF_2O)_m-(CF_2CF_2O)_n-CF_2CH_2OSO_2ONa \quad (25)$$

$$CF_3-O(CF_2O)_m-(CF_2CF_2O)_n-CF_2CH_2OSO_2OCo_{(\frac{1}{2})} \quad (26)$$

$$HOCOCF_2-O(CF_2O)_m-(CF_2CF(CF_3)O)_n-CF_2COOH \quad (27)$$

$$NaOCOCF_2-O(CF_2O)_m-(CF_2CF(CF_3)O)_n-CF_2COONa \quad (28)$$

$$HOSO_2CF_2-O(CF_2O)_m-(CF_2CF(CF_3)O)_n-CF_2SO_2OH \quad (29)$$

$$(OH)_2POCF_2-O(CF_2O)_m-(CF_2CF(CF_3)O)_n-CF_2PO(OH)_2 \quad (30)$$

$$NaOSO_2CF_2-O(CF_2O)_m-(CF_2CF(CF_3)O)_n-CF_2SO_2ONa \quad (31)$$

$$Co_{(\frac{1}{2})}OSO_2CF_2-O(CF_2O)_m-(CF_2CF(CF_3)O)_n-CF_2SO_2O-Co_{(\frac{1}{2})} \quad (32)$$

In the exemplary compounds (1) to (32), m and n each represents a positive integer and the sum of m and n is from 6 to 15, preferably 8 to 12.

Further, the compounds as represented below also are effective compounds as the first fluorinated polyethers, for attaining the objects of the present invention and these compounds are particularly preferably used when the magnetic layer is a ferromagnetic metal thin film.

$$F[CF(CF_3)CF_2O]_nCF(CF_3)COOH \quad (33)$$

$$F[CF(CF_3)CF_2O]_nCF(CF_3)COONa \quad (34)$$

$$F(CF_2CF_2O)_nCF_2CF_2COOH \quad (35)$$

In the compounds (33) to (35), the positive integer n represents 4 to 25, preferably 8 to 15.

The second fluorinated polyether used for the magnetic recording medium of the present invention has a group selected from the group consisting of an alkoxycarbonyl group, an acyloxy group and a hydroxyl group at one or both terminals thereof. The number-average molecular weight of the second fluorinated polyether is preferably 1,800 to 10,000.

Examples of the alkoxycarbonyl group, the acyloxy group and the hydroxyl group include $CH_3OCO-$, $C_2H_5COCO-$, $C_{12}H_{25}OCO-$, $HCOO-$, $CH_3COO-$, $C_2H_5COO-$, $C_{17}H_{35}COO-$, $C_6H_5OCO-$, $C_6H_5COO-$, and $-OH$.

Examples of the second fluorinated polyether include $$CH_3OCOCF_2-O(CF_2O)_m-(CF_2CF_2O)_n-CF_2COOCH_3 \quad (36)$$

$$HOCF_2-O(CF_2O)_m-(CF_2CF_2O)_n-CF_2OH \quad (37)$$

$$C_{11}H_{23}COOCH_2CF_2-O(CF_2O)_m-(CF_2CF_2O)_n-CF_2CH_2OCO-C_{11}H_{23} \quad (38)$$

$$C_6H_5OCOCF_2-O(CF_2O)_m-(CF_2CF_2O)_n-CF_2COOC_6H_5 \quad (39)$$

$$CF_3-O(CF_2O)_m-(CF_2CF_2O)_n-CF_2COOCH_3 \quad (40)$$

$$CF_3-O(CF_2O)_m-(CF_2CF_2O)_n-CF_2OH \quad (41)$$

In the exemplary compounds (36) to (41), m and n each represents a positive integer and the sum of m and n is from 6 to 15, preferably 8 to 12.

Further, the compounds as represented below also are effective compounds as the second fluorinated polyethers, for attaining the objects of the present invention and these compounds are particularly preferably used when the magnetic layer is a ferromagnetic metal thin film.

$$F[CF(CF_3)CF_2O]_nCF(CF_3)COOCH_3 \quad (42)$$

$$F[CF(CF_3)CF_2O]_nCF(CF_3)COOC_2H_5 \quad (43)$$

$$F[CF(CF_3)CF_2O]_nCF(CF_3)CH_2OH \quad (44)$$

$$F[CF(CF_3)CF_2O]_nCF(CF_3)CH_2OCOC_2H_5 \quad (45)$$

In the compounds (42) to (45), the positive integer n represents 4 to 25, preferably 8 to 15.

The combined amount of the first fluorinated polyether and the second fluorinated polyether used for the magnetic recording medium of the present invention is preferably 0.5 to 10% by weight based on the amount of ferromagnetic powder when the fluorinated polyethers of the present invention are added to the interior of the magnetic layer of the coating type magnetic recording medium.

The combined amount is preferably 1 to 50 mg/m$^2$, more preferably 2 to 20 mg/m$^2$ when the fluorinated polyethers of the present invention are top coated on the surface of the magnetic layer of the coating type magnetic recording medium or on the ferromagnetic metallic thin film of the metallic thin film type magnetic recording medium.

When the amount exceeds the above upper limit, the amount of the perfluoropolyethers on the surface of the magnetic layer becomes excessive and problems such as sticking are caused. Further, a problem is caused that when the perfluoropolyether compounds are added to the magnetic layer of the coating type magnetic recording medium, the compounds are separate from the binder resin and migrate out of the layer to thereby reduce durability.

On the other hand, when the amount is smaller than the above defined lower limit, the amount of the perfluoropolyethers existing on the surface of the magnetic layer is insufficient so that the desired lubricating effect cannot be adequately obtained.

The mixing ratio of the first fluorinated polyether to the second fluorinated polyether is preferably from 1:100 to 10:1 by weight.

When the ratio of the first fluorinated polyether to be mixed is too low, durability is poor, while when the ratio is too high, sticking during running is liable to be encountered.

If desired, other lubricants may be used together with the fluorinated polyether compounds of the present invention. It is desired that other lubricants are added to the surface of the magnetic layer.

Examples of other lubricants which can be mixed include saturated and unsaturated fatty acids (e.g., myristic acid, stearic acid, oleic acid), metallic soap, fatty acid amides, fatty acid esters (e.g., various monoesters, fatty acid esters of polyhydric alcohols such as sorbitan and glycerin, esters of polybasic acids), higher aliphatic alcohols, monoalkyl phosphates, dialkyl phosphates, trialkyl phosphates, paraffins, silicone oil, animal and vegetable oil, mineral oil, higher aliphatic amines; inorganic fine powders such as graphite, silica, molybdenum disulfide and tungsten disulfide; fine powders of resins such as polyethylene, polypropylene, polyvinyl chloride, ethylene-vinyl chloride copolymer and polytetrafluoroethylene; α-olefin polymers; and unsaturated aliphatic hydrocarbons which are liquid at room temperature and fluorocarbons.

The amounts of use of these other lubricants vary depending on the intended use, but are generally 1/10 times to twice the weight of the fluorinated polyethers of the present invention.

As techniques suitable for providing the aforesaid perfluoropolyethers in the recording mediums of the present invention, noteworthy are a method wherein the fluorinated ethers are incorporated within the magnetic layer and a method wherein the fluorinated ethers are top-coated on the surface of the magnetic layer (e.g., examples of the method for forming the top coat include a method wherein the ethers are dissolved in an organic solvent and the solution is coated on the substrate followed by drying; a method wherein the ethers are molten and coated on the substrate; a method wherein the substrate is immersed in a solution of the ethers dissolved in an organic solvent to thereby allow the esters to be adsorbed by the surface of the substrate; and Langmuir-Blodgett process well known to those of skill in the art).

When the magnetic recording medium of the present invention is the metallic thin film type magnetic recording medium, the ferromagnetic metallic thin film is formed from iron, cobalt, nickel, other ferromagnetic metal or a ferromagnetic alloy such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W or Co-Ni-Re by means of electroplating, electroless plating, vapor phase plating, sputtering process, vapor deposition, ion plating or other conventional metal deposition techniques. When the film is used as the magnetic recording medium, the thickness of the film is in the range of 0.02 to 2 μm, preferably 0.05 to 0.4 μm.

When oxygen or nitrogen is introduced into the ferromagnetic metallic thin film by carrying out vapor deposition in an oxygen or nitrogen stream in the formation of the metallic thin film, electromagnetic transduction characteristics and durability can be further improved. In addition to oxygen, N, Cr, Ga, As, Sr, Zr, Nb, Mo, Rh, Pd, Sn, Sb, Te, Pm, Re, Os, Ir, Au, Hg, Pb, Bi or Mg may be contained.

When the magnetic layer has protrusions having a height of 1 to 500 nm (nm: Nano meter = $10^{-9}$ m), running properties and durability in particular are superior, though there is no particular limitation with regard to the surface profile of the magnetic layer.

The thickness of the support is preferably 4 to 50 μm. If desired, an undercoat layer may be provided on the surface of the support to improve the adhesion of the ferromagnetic thin film and magnetic characteristics.

Examples of the supports used in the present invention include plastic bases such as polyethylene terephthalate, polyimides, polyamides, polyvinyl chloride, cellulose triacetate, polycarbonates, polyethylene naphthalate and polyphenylene sulfide and Al, Ti and stainless steel.

It is effective to provide fine protrusions on the surface of the support (consequently, complementary unevenness will be formed on the surface of the magnetic layer) before the formation of the metallic thin film to improve running durability. The density of the fine protrusions to be provided is preferably $2 \times 10^6$ to $2 \times 10^8$ protrusions/mm$^2$, and the height of each protrusion is preferably 1 to 50 nm.

There is no particular limitation with regard to the size and surface treatment of ferromagnetic powder used for the coating type magnetic recording medium.

The ferromagnetic powder is generally used in the form of needle, granule, dice, rice grain or plate, though there is no particular limitation with regard to the form of the powder. The crystallite size of the ferromagnetic powder is preferably not larger than 450 Å (as measured by X-ray diffractometry) from the viewpoint of electromagnetic transduction characteristics.

The binder for use in forming the magnetic layer can be chosen from among conventional binders. Examples of the binder include vinyl chloride-vinyl acetate copolymer, copolymers of vinyl chloride and vinyl acetate with vinyl alcohol, maleic acid and/or acrylic acid, vinyl chloride-vinylidene chloride copolymer, vinyl chloride-acrylonitrile copolymer, ethylene-vinyl acetate copolymer, cellulose derivatives such as nitro cellulose resin, acrylic resins, polyvinyl acetal resin, polyvinyl butyral resin, epoxy resins, phenoxy resin, polyurethane resin and polycarbonate polyurethane resin. Compounds obtained by introducing at least one polar group (epoxy group, $CO_2H$, OH, $NH_2$, $SO_3M'$, $OSO_3M,'$ $PO_3M'_2$, $OPO_3M'_2$ wherein M' is a hydrogen atom, an alkali metal or ammonium and when one group has two or more M' constituents, the M' constituents may be the same or different) into the molecule of each of the above-described binders are preferred to further improve dispersibility and durability. The content of the polar group is preferably $10^{-7}$ to $10^{-3}$ equivalents, more preferably $10^{-6}$ to $10^{-4}$ equivalents per gram of the binder.

The above-described binders may be used either alone or as a mixture of two or more of them. They are often cured by adding conventional isocyanate crosslinking agents.

Further, an acrylic ester oligomer and a monomer may be used as a binder component, and the ether compounds of the present invention can be applied to radiation-curable binders.

The content of the whole binders in the magnetic layer of the magnetic recording medium of the present invention is 10 to 100 parts by weight, preferably 20 to 40 parts by weight per 100 parts by weight of the ferromagnetic powder.

It is preferred that the magnetic layer of the magnetic recording medium of the present invention contains inorganic particles having a Mohs hardness of at least 5.

Any inorganic particles can be used, so long as they have a Mohs hardness of at least 5. Examples of the inorganic particles having a Mohs hardness of at least 5 include $Al_2O_3$ (Mohs hardness 9), TiO (Mohs hardness 6), $TiO_2$ (Mohs hardness 6.5), $SiO_2$ (Mohs hardness 7), $SnO_2$ (Mohs hardness 6.5), $Cr_2O_3$ (Mohs hardness 9) and $\alpha$-$Fe_2O_3$ (Mohs hardness 5.5), These compounds maybe used either alone or as a mixture of two or more of them.

Inorganic particles having a Mohs hardness of at least 8 are particularly preferred. When inorganic particles having a Mohs hardness of lower than 5 are used, the inorganic particles are liable to drop out from the magnetic layer, and such particles have a small abrasive action on head and, hence, the clogging of head is liable to be caused and running durability becomes poor.

The content of inorganic particles is generally 0.1 to 20 parts by weight, preferably 1 to 10 parts by weight per 100 parts by weight of ferromagnetic powder.

It is preferred that the magnetic layer contains carbon black having an average particle diameter of particularly preferably 10 to 300 nm in addition to the above inorganic particles.

An embodiment of the process for producing the magnetic recording medium of the present invention will be illustrated below.

The ferromagnetic powder, the binder resin, the aforesaid first fluorinated polyether, the aforesaid second fluorinated polyether, and other optional fillers and additives are kneaded with a solvent to prepare a magnetic coating material. Solvents conventionally used in the preparation of magnetic coating materials can be used as the solvents for use in the kneading.

The above ingredients may be added in any order without particular limitation with regard to the method of kneading.

Conventional additives such as dispersant, antistatic agent, lubricant, for example, may be added in the preparation of the magnetic coating material.

Conventional dispersants can be used. Examples of the dispersants include fatty acids having 12 to 22 carbon atoms, salts and esters thereof, compounds wherein a part or the whole of hydrogen atoms of the fatty acids is replaced with fluorine atom, amides of the fatty acids, aliphatic amines, higher alcohols, polyalkylene oxide alkylphosphoric esters, alkylphosphoric esters, alkyboric esters, sarcosinates, alkyl ether esters, trialkylpolyolefins, oxy quaternary ammonium salts and lecithin.

The dispersants are used in an amount of generally 0.1 to 10 parts by weight per 100 parts by weight of ferromagnetic powder.

Examples of the antistatic agent include electrically conductive powders such as carbon black and carbon black-grafted polymers; natural surfactants such as saponin; nonionic surfactants such as alkylene oxide series surfactants, glycerol series surfactants and glycidol series surfactants; cationic surfactants such as higher alkylamines, quaternary ammonium salts, salts of heterocyclic compounds such as pyridine, phosphoniums and sulfoniums; anionic surfactants having an acid group such as carboxylic acid, phosphoric acid, sulfuric ester or phosphoric ester group; and ampholytic surfactants such as amino acids, aminosulfonic acids and sulfuric esters or phosphoric esters of aminoalcohols. When electrically conductive powders are used as the antistatic agent, they are used in an amount of 0.1 to 10 parts by weight per 100 parts by weight of the ferromagnetic powder, while when the surfactants are used, they are used in an amount of 0.12 to 10 parts by weight per 100 parts by weight of the ferromagnetic powder.

The aforesaid additives such as dispersant, antistatic agent and lubricant are not described to have only the aforesaid effects in a limited sense. For example, the dispersant may additionally function as a lubricant or an antistatic agent. Accordingly, the effect and function derived from the compounds as classified above should not be construed as limited to the above-described general classifications. When a material having two or more effects and functions is used, the amount of the multi-functional material to be added should be determined by taking into consideration the total effects and functions derivable therefrom.

The thus-prepared magnetic coating material is coated on the non-magnetic support. The support may be coated directly with the coating material, or may be coated through an interlayer such as an adhesive layer. The term "interlayer" as used herein refers to a single layer composed of an adhesive layer or a composite layer composed of non-magnetic fine particles such as carbon dispersed in a binder.

The binder for the interlayer containing carbon can be arbitrarily chosen from among various binders conventionally used for the magnetic layers. The particle size of carbon is preferably 10 to 50 nm, and the ratio of the binder to carbon is preferably from 100:10 to 100:150 by weight. The thickness of the interlayer is preferably 0.1 to 2 μm for the single adhesive layer and 0.5 to 4 μm for the composite layer containing non-magnetic powder.

The interlayer may contain a lubricant which is the same as or different from those used for the magnetic layer.

The details of method for dispersing ferromagnetic powder in the binder and method for coating the support with the coating material are described in JP-A-54-

46011 and U.S. Pat. No. 4,320,159 (which corresponds to JP-A-54-21805).

The thickness of the magnetic layer thus coated is generally about 0.5 to 10 μm, preferably 0.7 to 6.0 μm as dry thickness.

When the magnetic recording medium is used in the form of a tape, the magnetic layer coated on the non-magnetic support is generally subjected to a treatment of orienting the ferromagnetic powder in the magnetic layer, that is, a magnetic field orientation treatment and then dried. When the magnetic recording medium is used in the form of a disc, the magnetic layer is subjected to a non-orienting treatment by magnetic field to remove the anisotropy of magnetic characteristics. Thereafter, the magnetic layer is optionally subjected to a surface smoothing treatment.

The magnetic recording medium of the present invention is excellent in frictional wear characteristics, lubricity, as well as in running durability under a wide range of environmental conditions as obtained by using a combination of the first fluorinated polyether having an oxo acid group or an oxo acid salt group at one or both terminals thereof and the second fluorinated polyether having a group selected from an alkoxycarbonyl group, an acyloxy group and a hydroxy group at one or both terminals thereof on the surface of the magnetic layer or in the interior thereof.

The following examples and comparative examples are provided to illustrate the novel features and effects of the present invention. It is understood, however, that the examples are intended for illustration only and it is not intended that the present invention be construed to be limited thereby. In the examples, parts are by weight, unless otherwise stated.

EXAMPLE 1

The magnetic coating composition set forth below was kneaded in a ball mill for 48 hours to disperse the components added. 5 parts of a polyisocyanate (Coronate L, manufactured by Nippon Polyurethane Co., Ltd.) was then added thereto. The mixture was further kneaded for one hour to disperse the polyisocyanate, and filtered through a filter having an average pore size of 1 μm to prepare a magnetic coating material. The surface of a polyethylene terephthalate support of 10 μm in thickness was coated with the resulting coating material by means of reverse roll coating in such an amount as to give a dry thickness of 4.0 μm.

| Magnetic Coating Composition | |
|---|---|
| Ferromagnetic alloy powder (composition: Fe 94%, Zn 4%, Ni 2%; coercive force: 1500 Oe; specific surface area: 54 mg/m²) | 100 parts |
| Vinyl chloride/vinyl acetate/maleic anhydride copolymer (400 × 110A manufactured by Nippon Zeon, Co., Ltd.; degree of polymerization: 400) | 12 parts |
| Abrasive (α-alumina, average particle size: 0.3 μm) | 5 parts |
| Carbon black (average particle size: 40 nm) | 2 parts |
| Methyl ethyl ketone | 300 parts |

While the magnetic coating material was undried, the coated non-magnetic support was subjected to magnetic field orientation by using a magnet of 3000 gauss and dried. The surface of the magnetic layer was supercalendered. The surface of the magnetic layer was then top-coated with a 0.2 wt % solution of 20 parts by weight of the compound having a number average molecular weight of 2,000, represented by the formula (1) wherein m and n are approximately the same as the first fluorinated polyether, and 20 parts by weight of the compound having a number-average molecular weight of 4,000, represented by the formula (36) (wherein m and n are approximately the same) as the second fluorinated polyether dissolved in 980 parts by weight of 1,1,2-trichloro-1,2,2-trifluoroethane by means of bar coater in such an amount as to give a coating weight of 5 g/m². The resulting magnetic recording medium was slit into a tape of 8 mm in width, thus preparing an 8 mm video tape as a sample.

The coating weight on the surface of the magnetic layer was calculated from the change of the weight of the 1,1,2-trichloro-1,2,2-trifluoroethane solution.

EXAMPLE 2

The procedure of Example 1 was repeated except that 20 parts by weight of the compound having a number-average molecular weight of 3,500, represented by the formula (1) (wherein m and n are approximately the same) as the first fluorinated polyether and 40 parts by weight of the compound having a number-average molecular weight of 4,000, represented by the formula (36) (wherein m and n are approximately the same) as the second fluorinated polyether were used to prepare an 8 mm video tape as a sample.

EXAMPLE 3

The procedure of Example 1 was repeated except that 20 parts by weight of the compound having a number-average molecular weight of 2,000, represented by the formula (2) (wherein m and n are approximately the same) as the first fluorinated polyether and 20 parts by weight of the compound having a number-average molecular weight of 4,000, represented by the formula (36) (wherein m and n are approximately the same) as the second fluorinated polyether were used to prepare an 8 mm video tape as a sample.

EXAMPLE 4

The procedure of Example 1 was repeated except that 40 parts by weight of the compound having a number-average molecular weight of 4,000, represented by the formula (4) (wherein m and n are approximately the same) as the first fluorinated polyether and 20 parts by weight of the compound having a number-average molecular weight of 4,000, represented by the formula (36) (wherein m and n are approximately the same) as the second fluorinated polyether were used to prepare an 8 mm video tape as a sample.

EXAMPLE 5

The procedure of Example 1 was repeated except that 40 parts by weight of the compound having a number-average molecular weight of 4,000, represented by the formula (5) (wherein m and n are approximately the same) as the first fluorinated polyether and 20 parts by weight of the compound having a number-average molecular weight of 4,000, represented by the formula (36) (wherein m and n are approximately the same) as the second fluorinated polyether were used to prepare an 8 mm video tape as a sample.

EXAMPLE 6

The procedure of Example 1 was repeated except that 40 parts by weight of the compound having a number-average molecular weight of 4,000, represented by the formula (6) (wherein m and n are approximately the same) as the first fluorinated polyether and 20 parts by weight of the compound having a number-average molecular weight of 4,000, represented by the formula (36) (wherein m and n are approximately the same) as the second fluorinated polyether were used to prepare an 8 mm video tape as a sample.

EXAMPLE 7

The procedure of Example 1 was repeated except that 40 parts by weight of the compound having a number-average molecular weight of 3,500, represented by the formula (1) (wherein m and n are approximately the same) as the first fluorinated polyether and 40 parts by weight of the compound having a number-average molecular weight of 4,000, represented by the formula (37) (wherein m and n are approximately the same) as the second fluorinated polyether were used to prepare an 8 mm video tape as a sample.

EXAMPLE 8

The procedure of Example 1 was repeated except that 40 parts by weight of the compound having a number-average molecular weight of 3,500, represented by the formula (1) (wherein m and n are approximately the same) as the first fluorinated polyether and 40 parts by weight of the compound having a number-average molecular weight of 2,000, represented by the formula (36) (wherein m and n are approximately the same) as the second fluorinated polyether were used to prepare an 8 mm video tape as a sample.

EXAMPLE 9

The procedure of Example 1 was repeated except that 40 parts by weight of the compound having a number-average molecular weight of 3,500, represented by the formula (1) (wherein m and n are approximately the same) as the first fluorinated polyether and 40 parts by weight of the compound having a number-average molecular weight of 4,000, represented by the formula (38) (wherein m and n are approximately the same) as the second fluorinated polyether were used to prepare an 8 mm video tape as a sample.

EXAMPLE 10

The procedure of Example 1 was repeated except that 40 parts by weight of the compound having a number-average molecular weight of 3,500, represented by the formula (1) (wherein m and n are approximately the same) as the first fluorinated polyether and 40 parts by weight of the compound having a number-average molecular weight of 4,000, represented by the formula (39) (wherein m and n are approximately the same) as the second fluorinated polyether were used to prepare an 8 mm video tape as a sample.

EXAMPLE 11

The procedure of Example 1 was repeated except that 40 parts by weight of the compound having a number-average molecular weight of 3,500, represented by the formula (1) (wherein m and n are approximately the same) as the first fluorinated polyether and 40 parts by weight of the compound having a number average molecular weight of 4,000, represented by the formula (41) (wherein m and n are approximately the same) as the second fluorinated polyether were used to prepare an 8 mm video tape as a sample.

COMPARATIVE EXAMPLE 1

The procedure of Example 1 was repeated except that 20 parts by weight of the compound having a number-average molecular weight of 3,500, represented by the formula (1) (wherein m and n are approximately the same) and 40 parts by weight of the compound having a number-average molecular weight of 4,000, represented by the formula (5) (wherein m and n are approximately the same) were used as the first fluorinated polyethers and the second fluorinated polyether was omitted to prepare an 8 mm video tape as a sample.

COMPARATIVE EXAMPLE 2

The procedure of Example 1 was repeated except that 20 parts by weight of the compound having a number-average molecular weight of 3,500, represented by the formula (1) (wherein m and n are approximately the same) and 40 parts by weight of the compound having a number-average molecular weight of 2,500, represented by the formula (2) (wherein m and n are approximately the same) were used as the first fluorinated polyethers and the second fluorinated polyether was omitted to prepare an 8 mm video tape as a sample.

COMPARATIVE EXAMPLE 3

The procedure of Example 1 was repeated except that 20 parts by weight of the compound having a number-average molecular weight of 3,500, represented by the formula (1) (wherein m and n are approximately the same) and 20 parts by weight of the compound having a number-average molecular weight of 2,500, represented by the formula (2) (wherein m and n are approximately the same) were used as the first fluorinated polyethers and the second fluorinated polyether was omitted to prepare an 8 mm video tape as a sample.

COMPARATIVE EXAMPLE 4

The procedure of Example 2 was repeated except that the first fluorinated polyether was omitted to prepare an 8 mm video tape as a sample.

COMPARATIVE EXAMPLE 5

The procedure of Example 1 was repeated except that the first fluorinated polyether was omitted and 40 parts by weight of the compound having a number-average molecular weight of 4,000, represented by the formula (36) (wherein m and n are approximately the same) and 40 parts by weight of the compound having a number-average molecular weight of 4,000, represented by the formula (38) (wherein m and n are approximately the same) were used as the second fluorinated polyether to prepare an 8 mm video tape as a sample.

COMPARATIVE EXAMPLE 6

The procedure of Example 1 was repeated except that the second fluorinated polyether was omitted and 20 parts by weight of the compound having a number-average molecular weight of 3,500, represented by the formula (1) (wherein m and n are approximately the same) as the first fluorinated polyether and 20 parts by weight of a fluorinated polyether having no polar group and a number-average molecular weight of 4,000, represented by the formula (46) (wherein m and n are approximately the same) were used to prepare an 8 mm video tape as a sample.

$$CF_3-(CF_3O)_m-(CF_2CF_2O)_n-CF_3 \quad (46)$$

COMPARATIVE EXAMPLE 7

The procedure of Example 1 was repeated except that the second fluorinated polyether was omitted and 40 parts by weight of the compound having a number-average molecular weight of 3,500, represented by the formula (1) (wherein m and n are approximately the same) as the first fluorinated polyether and 40 parts by weight of a fluorinated polyether having no polar group and a number-average molecular weight of 4,000, represented by the following formula (47) were used to prepare an 8 mm video tape as a sample.

$$CF_3-(CF_2CF_2(CF_3)O)_n-CF_3 \quad (47)$$

COMPARATIVE EXAMPLE 8

The procedure of Example 1 was repeated except that the first fluorinated polyether was omitted and 40 parts by weight of the compound having a number-average molecular weight of 4,000, represented by the formula (36) (wherein m and n are approximately the same) as the second fluorinated polyether and 40 parts by weight of the compound having a number-average molecular weight of 4,000, represented by the following formula (46) (wherein m and n are approximately the same) were used to prepare an 8 mm video tape as a sample.

COMPARATIVE EXAMPLE 9

The procedure of Example 1 was repeated except that the first fluorinated polyether was omitted and 20 parts by weight of the compound having a number-average molecular weight of 4,000, represented by the formula (36) (wherein m and n are approximately the same) as the second fluorinated polyether and 20 parts by weight of the compound having a number-average molecular weight of 4,000, represented by the following formula (47) were used to prepare an 8 mm video tape as a sample.

COMPARATIVE EXAMPLE 10

The procedure of Example 1 was repeated except that the second fluorinated polyether was omitted and 20 parts by weight of the compound having a number-average molecular weight of 3,500, represented by the formula (1) (wherein m and n are approximately the same) as the first fluorinated polyether and 20 parts by weight of butyl stearate were used to prepare an 8 mm video tape.

COMPARATIVE EXAMPLE 11

The procedure of Example 1 was repeated except that the second fluorinated polyether was omitted and 40 parts by weight of the compound having a number-average molecular weight of 3,500, represented by the formula (1) (wherein m and n are approximately the same) as the first fluorinated polyether and 40 parts by weight of silicone 100CS (KF-96, manufactured by Shin-Etsu Chemical Co., Ltd.) were used to prepare an 8 mm video tape as a sample.

COMPARATIVE EXAMPLE 12

The procedure of Example 1 was repeated except that the second fluorinated polyether was omitted and 40 parts by weight of the compound having a number-average molecular weight of 3,500, represented by the formula (1) (wherein m and n are approximately the same) as the first fluorinated polyether and 40 parts by weight of stearic acid were used to prepare an 8 mm video tape as a sample.

COMPARATIVE EXAMPLE 13

The procedure of Example 1 was repeated except that the first fluorinated polyether was omitted and 20 parts by weight of the compound having a number-average molecular weight of 4,000, represented by the formula (36) (wherein m and n are approximately the same) as the second fluorinated polyether and 20 parts by weight of butyl stearate were used to prepare an 8 mm video tape as a sample.

COMPARATIVE EXAMPLE 14

The procedure of Example 1 was repeated except that both the first fluorinated polyether and the second fluorinated polyether were omitted and 20 parts by weight of butyl stearate and 20 parts by weight of the fluorinated polyether having a number-average molecular weight of 4,000 and no polar group, represented by the formula (46) (wherein m and n are approximately the same) were used to prepare an 8 mm video tape as a sample.

Each sample of the thus-obtained 8 mm video tapes was tested and still durability, a coefficient of friction at 10° C. and 80% RH and at 40° C. and 80% RH and a coefficient of friction after running were measured under the following conditions.

Still Durability

A signal of 7 MHz was recorded on each sample of 8 mm video tape by using 8 mm VTR (FUJIX-8, a product of Fuji Photo Film Co., Ltd.) and reproduced under conditions of −10° C. A time taken till the reproduced image in the pose mode disappeared was referred to as still durability.

Coefficient of Friction

A sample of 8 mm video tape was wound around a stainless steel pole at a winding angle of 180° under a tension (T1) of 50 g. A tension (T2) required for running the sample at a speed of 3.3 cm/s under said tension was measured. The friction coefficient μ of the video tape was determined from the following formula on the basis of the measured value.

$$\mu = 1/\pi \cdot \ln(T2/T1)$$

The test for the friction coefficient was carried out under two conditions of (a) at 10° C. and 80% RH and (b) at 40° C. and 80% RH.

Further, the coefficient of friction after running was measured by measuring the coefficient of friction of the video tape at 23° C. and 70% RH after 200 running passes were repeatedly made at 20° C. and 10% RH over a period of 120 minutes.

The results are shown in Table 1.

TABLE 1

| Sample | Still Durability (min) | Coefficient of Friction 10° C. 80% RH | 40° C. 80 RH % | After Running |
|---|---|---|---|---|
| Example 1 | at least 120 | 0.22 | 0.25 | 0.23 |
| Example 2 | " | 0.22 | 0.23 | 0.23 |
| Example 3 | " | 0.22 | 0.23 | 0.24 |
| Example 4 | " | 0.22 | 0.24 | 0.23 |
| Example 5 | " | 0.22 | 0.23 | 0.23 |
| Example 6 | " | 0.22 | 0.23 | 0.23 |
| Example 7 | " | 0.22 | 0.23 | 0.25 |
| Example 8 | " | 0.22 | 0.24 | 0.24 |
| Example 9 | " | 0.22 | 0.22 | 0.23 |
| Example 10 | " | 0.22 | 0.23 | 0.23 |
| Example 11 | " | 0.22 | 0.23 | 0.23 |
| Comp. Ex. 1 | 70 | 0.25 | 0.25 | 0.28 |
| Comp. Ex. 2 | 40 | 0.25 | 0.26 | 0.29 |
| Comp. Ex. 3 | 40 | 0.23 | 0.26 | 0.28 |
| Comp. Ex. 4 | at least 120 | 0.31 | 0.44 | 0.51 |
| Comp. Ex. 5 | " | 0.37 | 0.51 | 0.58 |
| Comp. Ex. 6 | " | 0.29 | 0.29 | 0.65 |
| Comp. Ex. 7 | 80 | 0.26 | 0.28 | 0.44 |
| Comp. Ex. 8 | 100 | 0.32 | 0.44 | 0.51 |
| Comp. Ex. 9 | 50 | 0.31 | 0.47 | 0.45 |
| Comp. Ex. 10 | 50 | 0.26 | 0.28 | 0.45 |
| Comp. Ex. 11 | 20 | 0.26 | 0.28 | 0.47 |
| Comp. Ex. 12 | 30 | 0.25 | 0.26 | 0.44 |
| Comp. Ex. 13 | 50 | 0.37 | 0.44 | 0.51 |
| Comp. Ex. 14 | 40 | 0.37 | 0.39 | 0.44 |

It is clear from Table 1 that the samples of Examples 1 to 11 have a low coefficient of friction under any conditions, do not cause an increase in a coefficient of friction even after repeated running under low-humidity conditions and are stable with regard to performance.

On the other hand, the comparative samples which contain merely the fatty acids or esters without using the specific perfluoropolyether compounds of the present invention or the combination of the perfluoropolyether compounds of the present invention, have a high coefficient of friction under high-temperature and high-humidity conditions, demonstrated a greatly increased coefficient of friction after repeatedly running under low-humidity conditions and are very disadvantageous and inferior in performance.

EXAMPLE 12

A cobalt-nickel magnetic thin film of 150 nm in thickness was formed on a polyethylene terephthalate film of 13 μm in thickness in an oxygen stream under vacuum of $5 \times 10^{-5}$ Torr at an angle of incidence of 50 degrees by means of oblique-incidence vapor deposition to prepare a ferromagnetic metallic thin film type magnetic recording medium.

An electron beam evaporation source was used as the evaporation source, and an alloy composed of cobalt (80%) and nickel (20%) was evaporated.

In the same way as in Example 1, the surface of the magnetic layer of the resulting magnetic recording medium was coated with a 0.2 wt% solution of 5 parts by weight of the compound having a number-average molecular weight of 2,000, represented by the formula (1) (wherein m and n are approximately the same) as the first fluorinated polyether and 5 parts by weight of the compound having a number-average molecular weight of 4,000, represented by the formula (36) (wherein m and n are approximately the same) as the second fluorinated polyether dissolved in 1,1,2-trichloro-1,2,2-trifluoroethane and dried to prepare a sample of an 8 mm video tape.

EXAMPLE 13

The procedure of Example 12 was repeated except that 5 parts by weight of the compound having a number-average molecular weight of 3,500, represented by the formula (1) (wherein m and n are approximately the same) as the first fluorinated polyether and 10 parts by weight of the compound having a number-average molecular weight of 4,000, represented by the formula (36) (wherein m and n are approximately the same) as the second fluorinated polyether were used to prepare an 8 mm video tape as a sample.

EXAMPLE 14

The procedure of Example 12 was repeated except that 5 parts by weight of the compound having a number-average molecular weight of 2,000, represented by the formula (2) (wherein m and n are approximately the same) as the first fluorinated polyether and 5 parts by weight of the compound having a number-average molecular weight of 4,000, represented by the formula (36) (wherein m and n are approximately the same) as the second fluorinated polyether were used to prepare an 8 mm video tape as a sample.

EXAMPLE 15

The procedure of Example 12 was repeated except that 10 parts by weight of the compound having a number-average molecular weight of 4,000, represented by the formula (4) (wherein m and n are approximately the same) as the first fluorinated polyether and 5 parts by weight of the compound having a number-average molecular weight of 4,000, represented by the formula (36) (wherein m and n are approximately the same) as the second fluorinated polyether were used to prepare an 8 mm video tape as a sample.

EXAMPLE 16

The procedure of Example 12 was repeated except that 10 parts by weight of the compound having a number-average molecular weight of 4,000, represented by the formula (5) (wherein m and n are approximately the same) as the first fluorinated polyether and 5 parts by weight of the compound having a number-average molecular weight of 4,000, represented by the formula (36) (wherein m and n are approximately the same) as the second fluorinated polyether were used to prepare an 8 mm video tape as a sample.

EXAMPLE 17

The procedure of Example 12 was repeated except that 10 parts by weight of the compound having a number-average molecular weight of 4,000, represented by the formula (6) (wherein m and n are approximately the same) as the first fluorinated polyether and 5 parts by weight of the compound having a number-average molecular weight of 4,000, represented by the formula (36) (wherein m and n are approximately the same) as the second fluorinated polyether were used to prepare an 8 mm video tape as a sample.

EXAMPLE 18

The procedure of Example 12 was repeated except that 10 parts by weight of the compound having a number-average molecular weight of 3,500, represented by the formula (1) (wherein m and n are approximately the same) as the first fluorinated polyether and 10 parts by weight of the compound having a number-average molecular weight of 4,000, represented by the formula (37) (wherein m and n are approximately the same) as the second fluorinated polyether were used to prepare an 8 mm video tape as a sample.

EXAMPLE 19

The procedure of Example 12 was repeated except that 10 parts by weight of the compound having a number-average molecular weight of 3,500, represented by the formula (1) (wherein m and n are approximately the same) as the first fluorinated polyether and 10 parts by weight of the compound having a number-average molecular weight of 2,000, represented by the formula (36) (wherein m and n are approximately the same) as the second fluorinated polyether were used to prepare an 8 mm video tape as a sample.

EXAMPLE 20

The procedure of Example 12 was repeated except that 10 parts by weight of the compound having a number-average molecular weight of 3,500, represented by the formula (1) (wherein m and n are approximately the same) as the first fluorinated polyether and 10 parts by weight of the compound having a number-average molecular weight of 4,000, represented by the formula (38) (wherein m and n are approximately the same) as the second fluorinated polyether were used to prepare an 8 mm video tape as a sample.

EXAMPLE 21

The procedure of Example 12 was repeated except that 10 parts by weight of the compound having a number-average molecular weight of 3,500, represented by the formula (1) (wherein m and n are approximately the same) as the first fluorinated polyether and 10 parts by weight of the compound having a number-average molecular weight of 4,000, represented by the formula (39) (wherein m and n are approximately the same) as the second fluorinated polyether were used to prepare an 8 mm video tape as a sample.

EXAMPLE 22

The procedure of Example 12 was repeated except that 10 parts by weight of the compound having a number-average molecular weight of 3,500, represented by the formula (1) (wherein m and n are approximately the same) as the first fluorinated polyether and 10 parts by weight of the compound having a number average molecular weight of 4,000, represented by the formula (41) (wherein m and n are approximately the same) as the second fluorinated polyether were used to prepare an 8 mm video tape as a sample.

COMPARATIVE EXAMPLE 15

The procedure of Example 12 was repeated except that 5 parts by weight of the compound having a number-average molecular weight of 3,500, represented by the formula (1) (wherein m and n are approximately the same) and 10 parts by weight of the compound having a number-average molecular weight of 4,000, represented by the formula (5) (wherein m and n are approximately the same) were used as the first fluorinated polyethers and the second fluorinated polyether was omitted to prepare an 8 mm video tape as a sample.

COMPARATIVE EXAMPLE 16

The procedure of Example 12 was repeated except that 5 parts by weight of the compound having a number-average molecular weight of 3,500, represented by the formula (1) (wherein m and n are approximately the same) and 10 parts by weight of the compound having a number-average molecular weight of 2,500, represented by the formula (2) (wherein m and n are approximately the same) were used as the first fluorinated polyethers and the second fluorinated polyether was omitted to prepare an 8 mm video tape as a sample.

COMPARATIVE EXAMPLE 17

The procedure of Example 12 was repeated except that 5 parts by weight of the compound having a number-average molecular weight of 3,500, represented by the formula (1) (wherein m and n are approximately the same) and 5 parts by weight of the compound having a number-average molecular weight of 2,500, represented by the formula (2) (wherein m and n are approximately the same) were used as the first fluorinated polyethers and the second fluorinated polyether was omitted to prepare an 8 mm video tape as a sample.

COMPARATIVE EXAMPLE 18

The procedure of Example 12 was repeated except that the first fluorinated polyether was omitted to prepare an 8 mm video tape as a sample.

COMPARATIVE EXAMPLE 19

The procedure of Example 12 was repeated except that the first fluorinated polyether was omitted and 10 parts by weight of the compound having a number-average molecular weight of 4,000, represented by the formula (36) (wherein m and n are approximately the same) and 10 parts by weight of the compound having a number-average molecular weight of 4,000, represented by the formula (38) (wherein m and n are approximately the same) were used as the second fluorinated polyethers to prepare an 8 mm video tape as a sample.

COMPARATIVE EXAMPLE 20

The procedure of Example 12 was repeated except that the second fluorinated polyether was omitted and 5 parts by weight of the compound having a number-average molecular weight of 3500, represented by the formula (1) (wherein m and n are approximately the same) as the first fluorinated polyether and 5 parts by weight of the compound having no polar group and a number-average molecular weight of 4,000, represented by the formula (46) (wherein m and n are approximately the same) were used to prepare an 8 mm video tape as a sample.

COMPARATIVE EXAMPLE 21

The procedure of Example 12 was repeated except that the second fluorinated polyether was omitted and 10 parts by weight of the compound having a number-average molecular weight of 3,500, represented by the formula (1) (wherein m and n are approximately the same) as the first fluorinated polyether and 10 parts by weight of the compound having no polar group and a number-average molecular weight of 4,000, represented by the formula (47) were used to prepare an 8 mm video tape as a sample.

COMPARATIVE EXAMPLE 22

The procedure of Example 12 was repeated except that the first fluorinated polyether was omitted and 10 parts by weight of the compound having a number-average molecular weight of 4,000, represented by the formula (36) (wherein m and n are approximately the same) as the second fluorinated polyether and 10 parts by weight of the compound having a number-average molecular weight of 4,000, represented by the formula (46) (wherein m and n are approximately the same) were used to prepare an 8 mm video tape as a sample.

COMPARATIVE EXAMPLE 23

The procedure of Example 12 was repeated except that the first fluorinated polyether was omitted and 5 parts by weight of the compound having a number-average molecular weight of 4,000, represented by the formula (36) (wherein m and n are approximately the same) as the second fluorinated polyether and 5 parts by weight of the compound having a number-average molecular weight of 4,000, represented by the formula (47) were used to prepare an 8 mm video tape as a sample.

COMPARATIVE EXAMPLE 24

The procedure of Example 12 was repeated except that the second fluorinated polyether was omitted and 5 parts by weight of the compound having a number-average molecular weight of 3,500, represented by the formula (1) (wherein m and n are approximately the same) as the first fluorinated polyether and 5 parts by weight of butyl stearate were used to prepare an 8 mm video tape as a sample.

COMPARATIVE EXAMPLE 25

The procedure of Example 12 was repeated except that the second fluorinated polyether was omitted and 10 parts by weight of the compound having a number-average molecular weight of 3,500, represented by the formula (1) (wherein m and n are approximately the same) as the first fluorinated polyether and 10 parts by weight of silicone 100CS were, used to prepare an 8 mm video tape as a sample.

COMPARATIVE EXAMPLE 26

The procedure of Example 12 was repeated except that the second fluorinated polyether was omitted and 40 parts by weight of the compound having a number-average molecular weight of 3,500, represented by the formula 1) (wherein m and n are approximately the same) as the first fluorinated polyether and 10 parts by weight of stearic acid were used to prepare an 8 mm video tape as a sample.

COMPARATIVE EXAMPLE 27

The procedure of Example 12 was repeated except that the first fluorinated polyether was omitted and 20 parts by weight of the compound having a number-average molecular weight of 4,000, represented by the formula (36) (wherein m and n are approximately the same) as the second fluorinated polyether and 5 parts by weight of butyl stearate were used to prepare an 8 mm video tape as a sample.

COMPARATIVE EXAMPLE 28

The procedure of Example 12 was repeated except that both the first fluorinated polyether and the second fluorinated polyether were omitted and 5 parts by weight of butyl stearate and 15 parts by weight of the fluorinated polyether having a number-average molecular weight of 4,000 and no polar group, represented by the formula (46) (wherein m and n are approximately the same) were used to prepare an 8 mm video tape as a sample.

EXAMPLE 23

The procedure of Example 12 was repeated except that 10 parts by weight of the compound having a number-average molecular weight of 2,000, represented by the formula (33) as the first fluorinated polyether and 10 parts by weight of the compound having a number-average molecular weight of 2,000, represented by the formula (44) as the second fluorinated polyether were used to prepare an 8 mm video tape as a sample.

Each sample of 8 mm video tapes of the ferromagnetic metallic thin film type magnetic recording mediums of Examples 12 to 23 and Comparative Examples 15 to 28 was tested under same conditions as those of Examples 1 to 11 and Comparative Examples 1 to 14 to measure still durability and a coefficient of friction.

The results are shown in Table 2.

TABLE 2

| Sample | Still Durability (min) | Coefficient of Friction | | |
|---|---|---|---|---|
| | | 10° C. 80% RH | 40° C. 80 RH % | After Running |
| Example 12 | at least 120 | 0.20 | 0.22 | 0.21 |
| Example 13 | " | 0.21 | 0.21 | 0.21 |
| Example 14 | " | 0.20 | 0.21 | 0.22 |
| Example 15 | " | 0.20 | 0.22 | 0.22 |
| Example 16 | " | 0.21 | 0.21 | 0.21 |
| Example 17 | " | 0.21 | 0.21 | 0.21 |
| Example 18 | " | 0.20 | 0.20 | 0.22 |
| Example 19 | " | 0.20 | 0.20 | 0.22 |
| Example 20 | " | 0.20 | 0.20 | 0.21 |
| Example 21 | " | 0.20 | 0.20 | 0.21 |
| Example 22 | " | 0.20 | 0.20 | 0.21 |
| Example 23 | " | 0.20 | 0.21 | 0.20 |
| Comp. Ex. 15 | 50 | 0.22 | 0.23 | 0.24 |
| Comp. Ex. 16 | 30 | 0.22 | 0.23 | 0.25 |
| Comp. Ex. 17 | 40 | 0.21 | 0.23 | 0.24 |
| Comp. Ex. 18 | at least 120 | 0.26 | 0.35 | 0.40 |
| Comp. Ex. 19 | " | 0.30 | 0.40 | 0.45 |
| Comp. Ex. 20 | " | 0.25 | 0.25 | 0.50 |
| Comp. Ex. 21 | 100 | 0.23 | 0.24 | 0.35 |
| Comp. Ex. 22 | 60 | 0.27 | 0.35 | 0.40 |
| Comp. Ex. 23 | 30 | 0.26 | 0.37 | 0.36 |
| Comp. Ex. 24 | 20 | 0.23 | 0.24 | 0.36 |
| Comp. Ex. 25 | 10 | 0.23 | 0.24 | 0.37 |
| Comp. Ex. 26 | 20 | 0.22 | 0.23 | 0.35 |
| Comp. Ex. 27 | 30 | 0.30 | 0.35 | 0.40 |
| Comp. Ex. 28 | 20 | 0.30 | 0.32 | 0.35 |

As is clear from the results set forth in Table 2, the samples of Examples 12 to 23 according to the present invention have superior overall properties in terms of durability and coeffiction of friction under a wide range of conditions in comparison to the samples of Comparative Examples 15 to 28.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having a magnetic layer thereon, wherein the surface of said magnetic layer contains (a) a first fluorinated polyether having an oxo acid group or an oxo acid salt group at one or both terminals thereof, and (b) a second fluorinated polyether having a group selected from the group consisting of an alkoxycarbonyl group, an acyloxy group and a hydroxyl group at one or both terminals thereof, and wherein said first fluorinated polyether and said second fluorinated polyether are contained in the surface of said magnetic layer after top coating in a combined amount of 1 to 50 mg/m$^2$ or said first fluorinated polyether and said second fluorinated polyether are incorporated into said magnetic layer in a combined amount of 0.5 to 10% by weight based on the amount of ferromagnetic powder, and wherein said first fluorinated polyether is mixed with said second fluorinated polyether in a mixing ratio of from 1:100 to 10:1 by weight.

2. A magnetic recording medium as in claim 1, wherein said magnetic layer is a ferromagnetic metallic thin film.

3. A magnetic recording medium as in claim 2, wherein said ferromagnetic metallic thin film has a thickness in the range of from 0.02 to 2 $\mu$m.

4. A magnetic recording medium as in claim 1, wherein said magnetic layer is provided as a coating comprising ferromagnetic powder and a binder.

5. A magnetic recording medium as in claim 4, wherein the thickness of said magnetic layer thus coated is about 0.5 to 10 $\mu$m.

6. A magnetic recording medium as in claim 1, wherein said oxo acid group or the oxo acid salt group of said first fluorinated polyether is selected from the group consisting of —COOH, —COOM, —OCOOH, —OCOOM, —SO$_3$H, —SO$_3$M, —OSO$_3$H, —OSO$_3$M, —PO$_3$H$_2$, —PO$_3$M$_2$, —PO$_3$HM, —OPO$_3$H$_2$, —OPO$_3$M$_2$, —OPO$_3$HM, —SO$_2$H, —SO$_2$M, —OSO$_2$H, —OSO$_2$M, —SO$_3$M, —PO$_2$H$_2$, —PO$_2$M$_2$, —PO$_2$HM, —OPO$_2$H$_2$, —OPO$_2$M$_2$, —OPO$_2$HM, —BO$_2$H$_2$, —BO$_2$M$_2$, —BO$_2$HM, —OBO$_2$H$_2$, —OBO$_2$M$_2$, and —OBO$_2$HM, wherein M is a cation other than hydrogen.

7. A magnetic recording medium as in claim 6, wherein the cation represented by M is selected from the group consisting of Na, K, Li, NH$_4$, ZN$_{(\frac{1}{2})}$, Be$_{(\frac{1}{2})}$, Mg$_{(\frac{1}{2})}$, Ca$_{(\frac{1}{2})}$, Sr$_{(\frac{1}{2})}$, Co$_{(\frac{1}{2})}$, Ni$_{(\frac{1}{2})}$, Cu$_{(\frac{1}{2})}$, primary ammonium, secondary ammonium, tertiary ammonium and quaternary ammonium.

8. A magnetic recording medium as in claim 1, wherein said group for said second fluorinated polyether is selected from the group consisting of CH$_3$OCO—, C$_2$H$_5$COCO—, C$_{12}$H$_{25}$OCO—, HCOO—, CH$_3$COO—, C$_2$H$_5$COO—, C$_{17}$H$_{35}$COO—, C$_6$H$_5$OCO—, C$_6$H$_5$COO—, and —OH.

9. A magnetic recording medium as in claim 4, wherein said binder is contained in an amount of from 10 to 100 parts by weight per 100 parts by weight of the ferromagnetic powder.

* * * * *